United States Patent
Richman

(10) Patent No.: US 6,754,874 B1
(45) Date of Patent: Jun. 22, 2004

(54) COMPUTER-AIDED SYSTEM AND METHOD FOR EVALUATING EMPLOYEES

(75) Inventor: Ira S. Richman, Huntington, NY (US)

(73) Assignee: Deloitte Development LLC, Hermitage, TN (US)

(*) Notice: Subject to any disclaimer, the term of this patent is extended or adjusted under 35 U.S.C. 154(b) by 207 days.

(21) Appl. No.: 10/159,822

(22) Filed: May 31, 2002

(51) Int. Cl.[7] ............................................. G06F 17/00
(52) U.S. Cl. ..................................... 715/507; 715/506
(58) Field of Search ................................. 715/507, 506, 715/505; 434/350, 353; 705/7

(56) References Cited

U.S. PATENT DOCUMENTS

| | | | |
|---|---|---|---|
| 5,991,595 A | * 11/1999 | Romano et al. | 434/353 |
| 6,052,512 A | 4/2000 | Peterson et al. | |
| 6,259,890 B1 | * 7/2001 | Driscoll et al. | 434/350 |
| 6,442,370 B1 | * 8/2002 | Driscoll et al. | 434/350 |
| 6,539,404 B1 | 3/2003 | Ouchi | |
| 6,615,182 B1 | * 9/2003 | Powers et al. | 705/7 |

* cited by examiner

Primary Examiner—Sanjiv Shah
(74) Attorney, Agent, or Firm—Kramer Levin Naftalis & Frankel LLP

(57) ABSTRACT

A computer-aided method of evaluating personnel performance. The method includes the steps of making available to a user an electronic evaluation form, inputting a first set of data into the electronic form corresponding to the user, submitting the form including the first set of data for review to a second user and inputting a second set of data into the electronic form corresponding to the second user. The method is implemented with a user friendly and easily navigable computer system that includes a display device for presenting the electronic forms for personnel evaluation and includes a tool for customizing the electronic forms. In a preferred embodiment, the system presents users with electronic forms and controls access to and editing of the electronic forms based on the user's role (e.g., Feedback Receiver, Feedback Provider, Second Level Reviewer, Career Counselor). All evaluation data is stored in at least one database for future access and report generation.

49 Claims, 11 Drawing Sheets

| Evaluation System | Feedback | Admin. | My Scorecards | Reports | My Goals |

| Save & Close | Preview | View/Edit Step 1 Information | Prior Year's Goals |

GOAL SETTING FORM

Feedback Receiver: Edgar Employee    Career Counselor: Counselor Charles — 610
620    630

| Select Area Below: | Expected Revenue(MR12101) | Target | Actual |
|---|---|---|---|
| PERFORMANCE GOALS<br>Leadership Effectiveness<br>Service Excellence<br>Revenue & Profit<br>*<br>*<br>*<br>*<br>Development Assignments | Recurring Clients (base business)<br>New Clients<br>Total Expected Personal Revenue Generation<br>Expected Book of Revenue Management<br>Total Personal Service Hours<br>Service Recognition Rate To Be Achieved<br>Receivable Weeks Outstanding Goal | $ 122554<br>$<br>$<br>$<br>2200 HRS<br>%<br>Wks | $<br>$<br>$<br>$<br>HRS<br>%<br>Wks |

| Feedback Receiver's Revenue & Profit Area Comments: | Career Counselor's Revenue & Profit Area Comments: |
|---|---|
| Last year I only billed 2000 hours. This year I would like to bill 2200 hours. If I can achieve this goal I believe that my revenues will improve significantly. | |

| Evaluation System | Feedback | Admin. | My Scorecards | Reports | My Goals |

Information Support Service Survey    [ Submit ]

Date Entered: 08/30/2002      Email: feedbackgiver@company.com
Name: Feedback Giver      Employee Number: 2551

Overall how would you rate the service of the IS Department?    ○1 ○2 ○3 ○4 ○5
(5 = high, 1 = low)

Was the IS Department representative with whom you dealt    ○1 ○2 ○3 ○4 ○5
courteous and professional?

Was the IS Department representative with whom you dealt    ○1 ○2 ○3 ○4 ○5
skilled and knowledgeable?

Did the IS Department representative resolve the situation to    ○1 ○2 ○3 ○4 ○5
your satisfaction?

Was the IS Department prompt in responding to your request?    ○1 ○2 ○3 ○4 ○5

How long did it take for the IS Department to resolve your situation?
   ○ < 1 hour
   ○ 1-3 hours
   ○ > 3 hours (Optional) Please provide additional feedback:

*FIG. 9*

COMPUTER-AIDED SYSTEM AND METHOD FOR EVALUATING EMPLOYEES

BACKGROUND OF THE INVENTION

The present invention relates to a system and method for evaluating an employee's performance and competency.

In today's economy, a company's most important assets are often its employees. Companies invest substantial resources to recruit, develop, motivate and retain their human resources. Employers offer positive incentives (e.g., promotions, awards, increased responsibility, bonuses) and threaten negative incentives (e.g., demotion, reprimand or termination) to increase productivity.

Employee evaluations are a powerful human resources tool that serve multiple purposes. Managers use evaluation information to make better promotion and reward decisions. Evaluations can be used to provide employees with feedback information, both positive and negative. Positive feedback is important to maintain employee morale, encourage desirable practices, and retain talent. Negative feedback (preferably accompanied by counseling and training) informs employees of areas where they are under-performing so that they can improve. Industrial psychologists have found that the more feedback, positive or negative, employees are given the happier they will be with their job and the better they will perform. Moreover in certain regulated industries, such as the accounting field, performance and competency evaluations can be mandatory. Failure to comply with this requirement can expose companies to significant penalties.

Despite its importance to a company's bottom line and future, employee evaluation is typically handled in a decentralized and inefficient manner. Typically a company's evaluation policy calls for periodic evaluations (often annual or biannual). These evaluations often consist of a manager writing out an evaluation, holding a brief counseling session with the employee, and then forwarding the forms to the human resources department. Some managers are more motivated than others to provide constructive and meaningful feedback, but there is no efficient way for the human resources department to supervise the feedback quality. As a result, the quality of feedback that employees receive often varies greatly. Because the process is so decentralized, it is very difficult to effectively disseminate company-wide performance goals, or to consistently evaluate the results achieved. Additionally, because the person evaluating an employee may change periodically, it is difficult to track an employee's long-term success at meeting goals. Feedback is often given informally, and thus does not become a part of an employee's permanent record, further exacerbating the continuity problem. The employees typically have no meaningful active participation in the evaluation process, which may leave them unsatisfied or with the belief that their evaluations are arbitrary.

The human resources department expends a significant amount of time and effort supervising the evaluation process. Often, this labor intensive process involves badgering managers who are tardy with evaluations or do not properly sign the forms. In fact, some estimates are that human resources officers spend as much as 50% of their time on these administrative tasks, which do not directly provide value to the evaluation process.

Once the evaluations have been collected from the managers they are typically placed into the employee's file. Because the evaluation information is stored on paper, or in a non-standardized electronic format, it is prohibitively expensive or even impossible, to run meta-level searches on evaluation data.

In short, current employee evaluation processes often risk being ineffective or inconsistent because they ignore potentially valuable sources of evaluation information, supervising the evaluation process is time consuming and difficult, employers often perceive the evaluation process as ineffective, inconsistent, and arbitrary, and the format of the information does not readily allow for convenient meta-level analysis.

Accordingly, a method, system and tool for evaluating employees is provided that overcomes the shortcomings in the prior art.

SUMMARY OF THE INVENTION

In a first aspect of the present invention, a computer-aided method of evaluating personnel performance is provided including the steps of making available to a first user a first electronic form, inputting a first set of data into the first electronic form corresponding to an employee's evaluation, submitting the first electronic form including the first set of data for review to a second user and inputting a second set of data into the first electronic form corresponding to the second user's review of the employee.

In another aspect of the present invention a second electronic form is made available to the first user and a third set of data corresponding to the employee's performance goals is input.

In another aspect of the present invention, the first user is the employee, the first set of data includes the employee's self evaluation data, the second user is a supervisor of the employee and the second set of data includes the supervisor's performance evaluation of the employee.

In another aspect of the present invention, the first electronic form including the first and second user data are submitted to a third user for input of a third set of performance evaluation data.

In still another aspect of the present invention, a system is also provided including display means for presenting the electronic forms for personnel evaluation and including means for customizing the electronic forms.

Accordingly, it is an object of the present invention to provide a computer-implemented system and method for automating and streamlining personnel performance evaluations.

Another object of the present invention is to provide a comprehensive employee evaluation method and system that makes available to employees a plurality of electronic forms or interfaces for inputting evaluation data and controls access based on an employee's role in the evaluation process.

Yet another object of the present invention is to provide a system and method accessible by all employees and administrators for streamlining the collection of evaluation data and the intelligent and fully-informed evaluation of employees based on the collected evaluation data.

Still another object of the present invention is to provide the evaluation system of the present invention with a tool for modifying or customizing any of the electronic forms or interfaces to meet the need of all users.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 6 illustrates, in block diagram form, a sample goal setting form;

FIG. 9 illustrates, in block diagram form, a sample evaluation form;

DETAILED DESCRIPTION OF THE PREFERRED EMBODIMENTS

Figure 1:
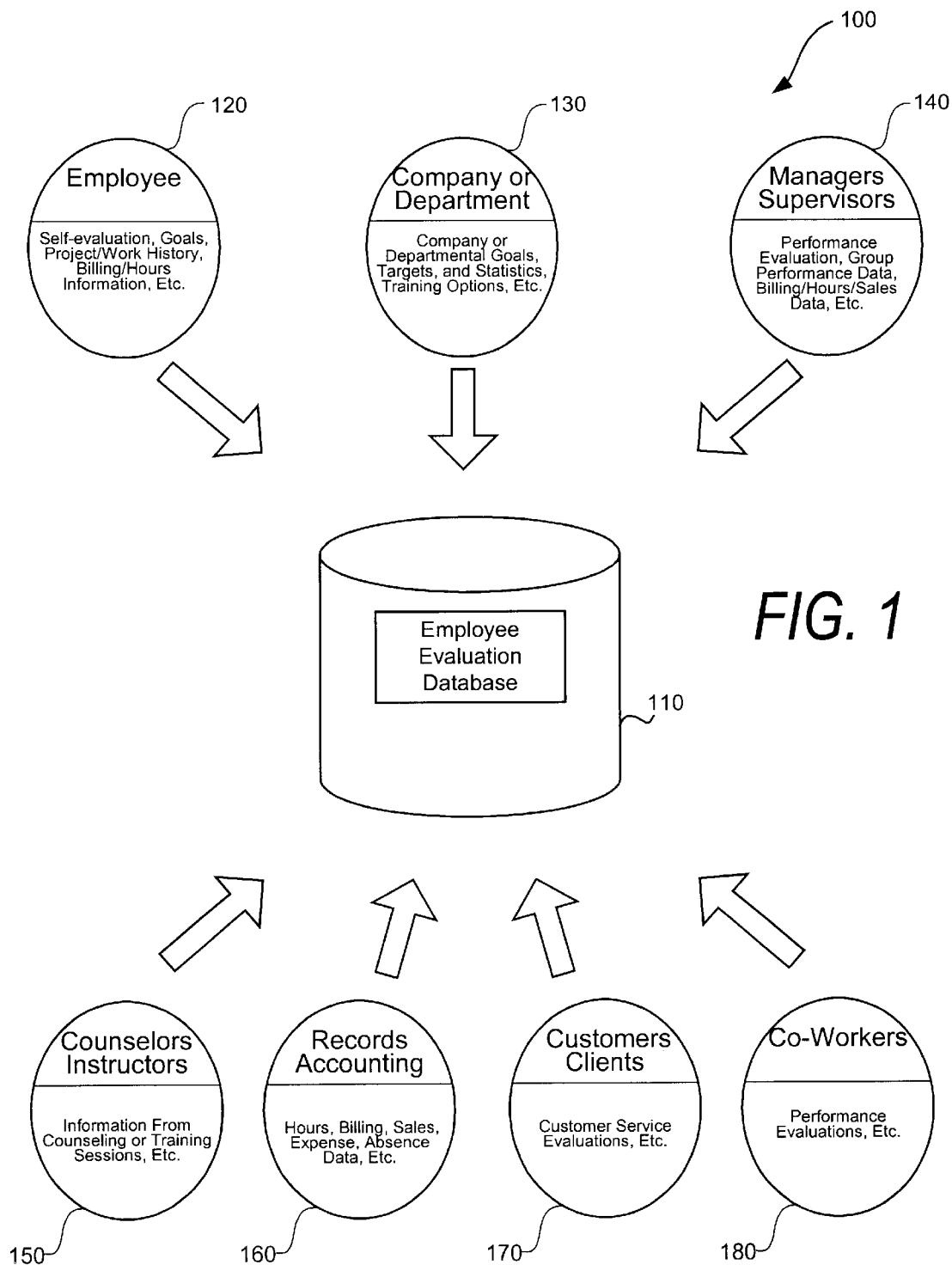
FIG. 1 illustrates, in block diagram form, the flow of information to the evaluation system.

The present invention is directed to a method and system for evaluating employees, whereby employee evaluation information is stored in a network accessible database, and to a tool for customizing employee evaluation information forms. Employee evaluation information is received from various parties having information that may be valuable to the employee evaluation process. For example, in many industries employees work for multiple managers or supervisors at the same time, each of whom may be able to provide useful insight. The employee herself can supply useful self-evaluation information. Human resources officers, career counselors, instructors, and customers can also provide valuable evaluation information. In addition, the records or accounting department may possess data on the employee's hours, billing, sales record, expenses or absence record that can be relevant to the evaluation process. The system according to a preferred embodiment of the invention is configured to receive data from at least all these sources to generate a comprehensive and in depth evaluation of an employee.

In a preferred embodiment of the present invention, a network accessible database system ("Evaluation System") is provided that is used to store, analyze and supply employee evaluation information. Various entities provide feedback and evaluation information that is used to counsel and evaluate the employees. The embodiment that is presently disclosed is intended to serve as an illustrative example of the present invention. It should be noted that the evaluation process, evaluation criteria and organization of the Evaluation System can be modified in numerous ways that are known in the art and may be custom tailored to the needs of a particular employer. The present example should not be taken as limiting the invention in any way.

The system of the present invention can be of the type including a distributed computer network having multiple computer terminals or workstations distributed over the network for accessing a remote server or servers. Each of the computer terminals is preferably associated with an entity or user and includes a CPU, input and output devices, and storage means. The workstations may belong to one of employees, managers or supervisors, counselors, instructors, human resources administrators, customers or clients, the records or accounting department, or to other parties. The server(s) preferably operates using a platform that is compatible with the various computer terminals in a client-server model. A network of this type is well know as the Internet wherein the remote servers include a web server, an application server and various databases for storing and accessing data. The client computer terminals use a web browser or other network compatible software to display data retrieved from the server. The client machine may in turn describe an internal LAN or WAN of an entity or user. Alternatively, the system may comprise an internal network such as a WAN or LAN operating using an Internet or similar protocol for connecting various terminals to each other or a central server over the computer network for sharing and exchanging information.

Lotus Domino, an enterprise scaleable web server platform, is one example of a software package that may be used to operate the Evaluation System website server. Components of the Evaluation System may be programmed in Java, Java Script, HTML, XML, Lotus Script, MS Web Components and other programming languages. Links to other databases within a company's information systems, as described below, may be accomplished by using SQL data lookups or other techniques known in the art. In a company. employing Outlook Mail or similar technology, automatic email messages may be generated by using a data feed or other known methods.

In an alternative embodiment, the system may be configured to allow users to create and modify documents off-line. The user can then log on to the Evaluation System and upload the new information into the database. Preferably, the connection and uploading process would be performed automatically by the Evaluation System software. This feature would be most useful for personnel who are working in off-site locations with limited access to the Evaluation System network.

In a typical environment or configuration, the Evaluation System database is maintained by the information technology department and administered by the human resources department of the company. The database is used to store employee evaluation information. Individuals within the company are assigned roles for purposes of the evaluation process. In the preferred embodiment each employee who is evaluated is assigned the role of "Feedback Receiver." Individuals, such as partners, project managers or other supervisors, who provide feedback to a Feedback Receiver, are "Feedback Providers." A Feedback Receiver may receive feedback from multiple Feedback Providers. Individuals senior to a Feedback Provider who may also provide feedback are "Second Level Reviewers." Alternatively, the Second Level Reviewers may be human resources officers or senior managers who are supervising the evaluation process. Each employee is assigned a "Career Counselor." The Career Counselor, typically a senior level employee, is responsible for advising the employee, helping her set goals and make career path decisions, supervising her evaluation process, and running the employee's periodic review sessions. The human resources department is responsible for administering the Evaluation System and designing the evaluation forms, which is accomplished by using a special dynamic form designer tool ("Designer Tool").

Users interact with the Evaluation System via a graphical user interface, and obtain access to the Evaluation System database by inputting their unique login name and password. A user's role defines her permissions with respect to the Evaluation System. For example, an employee is able to access her own evaluation information, but can not access the evaluation information files of other co-workers. It should be noted that a user may have multiple roles. For example, a group manager may be both a Feedback Receiver and a Feedback Provider. The Evaluation System recognizes this dual role and automatically avoids what would otherwise be redundant information requirements.

Referring to FIG. 1, the general flow of information to the Evaluation System, shown generally as 100, is illustrated in block diagram form. The Evaluation System database 110 receives and stores employee evaluation information. The database 110 receives information from various parties. Feedback Receivers 120 may be asked to input self-evaluations (initiate a project performance evaluation), goals, project or work histories, billing or hours data, and other information. Company or departmental-level managers 130 may input company or departmental goals and targets, training options, and other information. Managers, project supervisors and other Feedback Providers 140 can input evaluation information for the employees that they supervise, group performance data, and other information. Feedback Providers can also initiate a project performance evaluation. Career Counselors and training instructors 150 can input information from counseling or training sessions, and other information. The records and accounting departments 160 can input employee time, billing, sales, expense, or absence data, and other information. Customers and clients 170 can input customer service evaluations. Co-workers 180 may also input performance evaluations or other information regarding other employees. FIG. 1 is intended to illustrate possible feedback and evaluation information sources, but is not intended to limit the potential sources of information that can be used with the present invention.

In the preferred embodiment of the present invention, the Evaluation System database collects data using three main interfaces or presentation formats: performance scorecards, goal setting forms, and counseling worksheets. The database may also contain billing, hours, sales, absence or other employee data, or links to databases holding this information. Each of these interfaces will be described in detail hereinafter. The Evaluation System may be configured to automatically insert the linked data where appropriate. For example, when creating a scorecard for a project, the Evaluation System may insert the number of hours billed to the project onto the scorecard. In other cases, information is a click away, for example, in setting goals the Suggested Future Goals from prior evaluations are available in a unified report.

Figure 2:
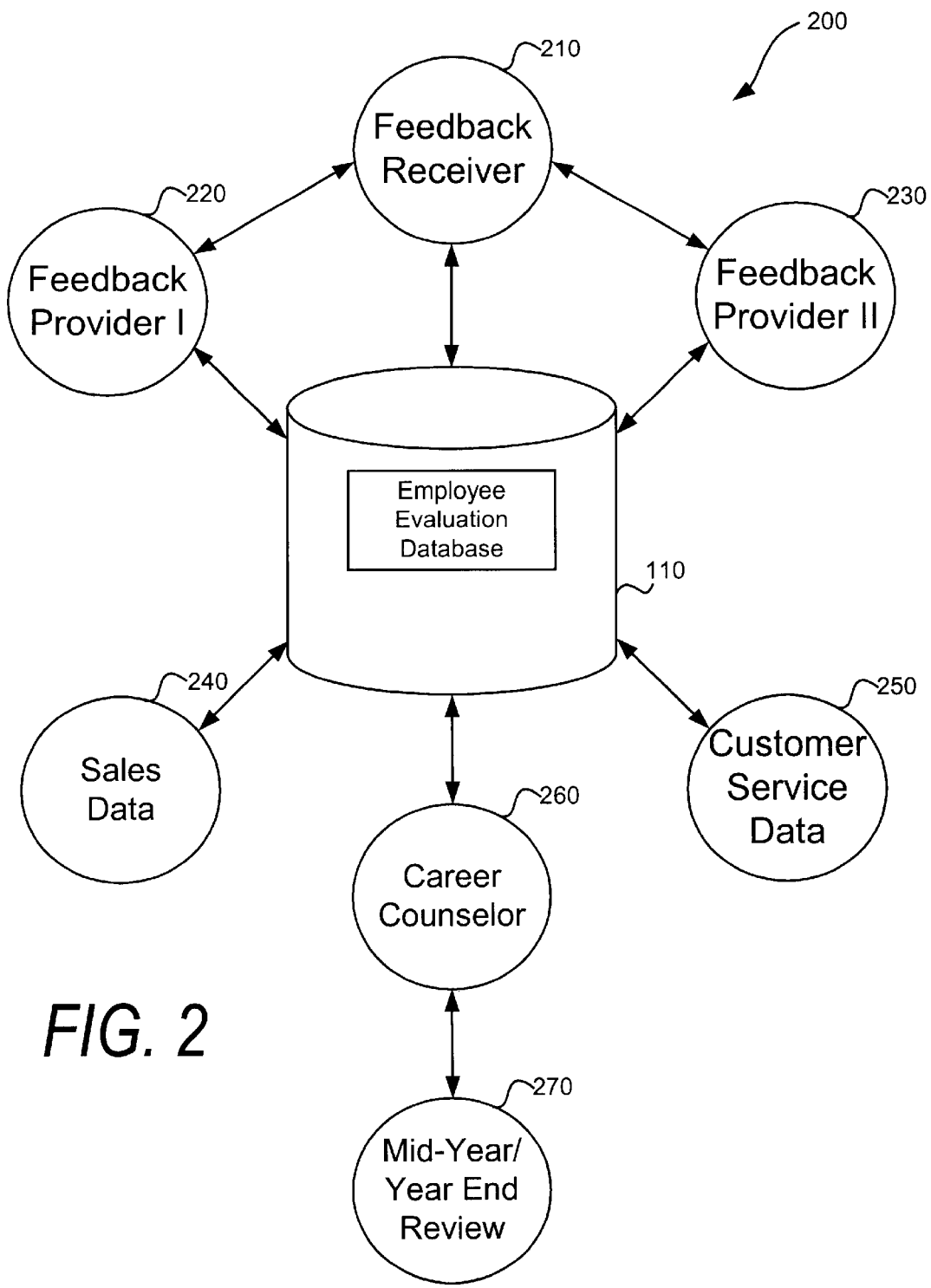
FIG. 2 illustrates, in block diagram form, a more specific example of the information flow for a particular employee.

Referring to FIG. 2, a more specific example of the information flow for a particular employee is illustrated in block diagram form, and shown generally as 200. In this example, the Feedback Receiver 210, is a salesperson at a large company. The Feedback Receiver is responsible for selling two products lines, and has a separate supervisor for each product line, Feedback Provider I 220 and Feedback Provider II 230. Each Feedback Provider evaluates the Feedback Receiver's 210 performance on a scorecard. These scorecards are stored in the Employee Evaluation Database 110, along with sales data 240 and customer service data 250. The customer service data 250 comes from annual telephone surveys which are conducted with the company's bigger clients. The sales data 240 is imported from the accounting department's records. The Career Counselor 260 assigned to the Feedback Receiver 210 accesses the Employee Evaluation Database 110 to obtain information to use during the Feedback Receiver's 210 mid-year and year-end review meetings 270 and inputs information summarizing the counseling sessions into the Evaluation system.

Figure 3:
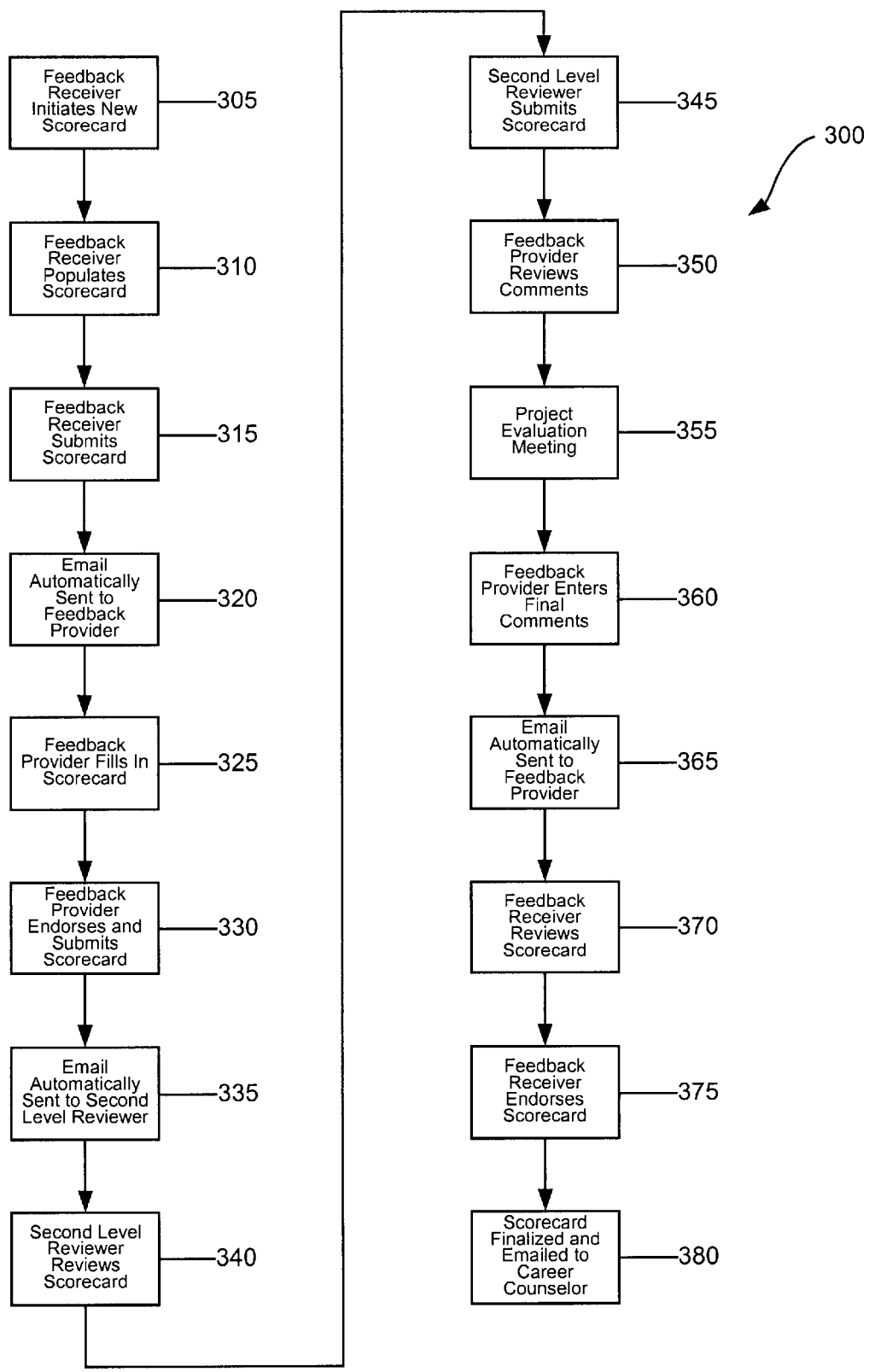
FIG. 3 illustrates, in flow-chart diagram form, the process by which an employee is evaluated for her performance on a particular project.

FIG. 3 illustrates in flow-chart diagram form the process by which a Feedback Receiver is evaluated for her performance on a particular project. Throughout the year the Feedback Receiver and her Feedback Providers input data into the Evaluation System on the Feedback Receiver through a first interface or electronic evaluation form, the scorecard. Scorecards are used to record evaluation information for a Feedback Receiver's work on a project or a non-engagement (tasks not directly billable to clients). Upon completion of a scorecard, the Feedback Provider schedules an evaluation session to discuss the Feedback Receiver's performance on a project. The scorecard serves as an agenda for the evaluation session and also memorializes the substance of the session.

In a preferred embodiment of the present invention the Feedback Receiver is emailed a list of projects for which scorecards are due. This email may be generated automatically in a system where a Feedback Receiver's ongoing projects are stored in the Evaluation System. Alternatively, the billing or accounting department may generate this email based on the Feedback Receiver's time sheets or billing records, or project managers may send the email to their project staff. Depending on the nature of the Feedback Receiver's position and the evaluation needs of the company, the definition of a project may vary. For example, in certain industries, staff tend to work for short periods of time on a number of different projects. Consequently, a project, for evaluation purposes, may consist of all of a Feedback Receiver's work with a particular manager or workgroup, all of a Feedback Receiver's work of a specific type (e.g., all of the Feedback Receiver's sales activity), or all of a Feedback Receiver's work during a particular time period.

Figure 4:
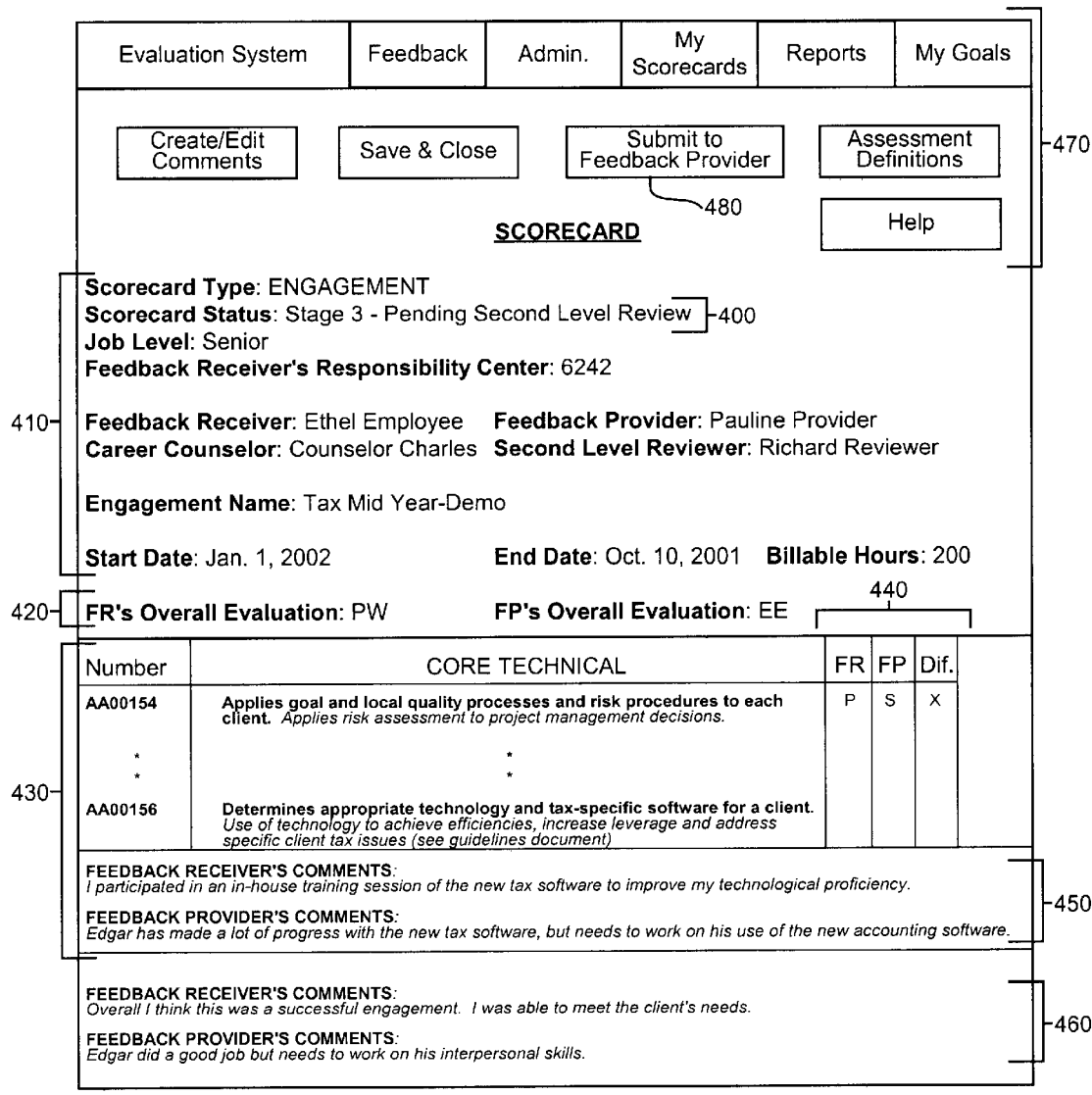
FIG. 4 illustrates, in block diagram form, a sample project scorecard.

The project evaluation process, shown generally as 300, begins at step 305 when a new scorecard is initiated. An exemplary scorecard is shown in FIG. 4 at a stage in the process. In one embodiment of the present invention the scorecard is initiated by a Feedback Receiver upon completion of a project, departure from a project, or after a specified period for on-going projects (e.g., after every two hundred hours of billing to a project or every 3 months). Alternatively, the scorecard can be initiated by the Feedback Provider, the project manager, the Feedback Receiver's designated Career Counselor, a human resources officer or a client.

The newly initiated scorecard is at Stage 1—Open, meaning that the scorecard has been initiated and the Feedback Receiver may now populate the empty scorecard with information. At this stage, only the Feedback Receiver may access the scorecard.

At step 310, the Feedback Receiver populates the newly initiated scorecard with information. The scorecard population process may be automated to a high degree. In a preferred embodiment of the present invention, the Evaluation System stores a list of the Feedback Receiver's projects, and when a project scorecard is initiated fills in the preliminary project information automatically (e.g., the project's name, supervisor's name, etc.). Where the Evaluation System does not contain a list of the Feedback Receiver's projects, the Feedback Receiver may initiate a blank scorecard, and manually input all of the project information.

The Feedback Receiver begins by identifying the project, the hours billed to the project, project managers worked with, clients worked for, the Feedback Receiver's designated Career Counselor, project start/end date, task identification number, and other information. As mentioned previously, some or all of this information can be extracted from other databases on the company's information network and automatically entered onto the form. Preferably, the information fields use pull down lists or entry validation where appropriate. For example, the Feedback Receiver may be presented with a pull-down list of Career Counselors, from which the Feedback Receiver's counselor may be selected. The Feedback Receiver's entry into the task identification number field may be validated against a list of valid task identification numbers. Depending on the size and needs of the company, the Feedback Receiver may also enter information regarding the Feedback Receiver's location, practice area or sub-group.

After entering this preliminary information, the Feedback Receiver enters self-evaluation information into the scorecard. The self-evaluation information begins with a text statement evaluating the Feedback Receiver's performance on a project. The self-evaluation may also consist of numerical scoring in a variety fields (e.g., scores for customer service, meeting deadlines, showing initiative).

In a preferred embodiment of the present invention the scorecard also contains a list of competencies grouped into competency areas. Competencies identify certain core employee skills and attributes and will vary depending on the industry. For example, a scorecard may contain the following competency areas: core technical, leadership effectiveness, management effectiveness, marketing sales & communication, service excellence, and specialized technical. Each competency area contains a list of specific task competencies. For example, the core technical competency area for an accounting group might include utilizing business knowledge, understanding and using technology, complying with and applying company audit methodology, applying professional standards, and other competencies. The Feedback Receiver is presented with a list of all of the relevant competencies for her position. From this list, the Feedback Receiver identifies each of the task competencies that were implicated in a particular project, views the written expectations for performance on that competency for an employee at the Feedback Receiver's job level, enters written comments describing performance relevant to each competency and in support of the rating, and then assigns herself a rating. The Feedback Receiver may also identify competencies that she would like to add as an improvement goal. In a preferred embodiment of the present invention, these goals for competency development may be automatically imported into the Feedback Receiver's Goal Setting Forms (described hereinafter).

Each competency is preferably listed along with two links. One link provides the user with a written explanation of the competency as well as the company's expectations in that area. For example, the written explanation for the understanding and using technology competency might list the various technological tools and programs that the employee is expected to be proficient with as well as the specific tasks which she should be able to perform. Ideally the written explanation and expectations are specific to the employee's particular position and level. This makes it easier for the company to communicate specific performance and development expectation to its employees. The second link is to reference or learning sites relevant to the particular competency. In this manner, the company can make it easy for employees to find relevant training information.

The scorecard uses five alphabetic proficiency assessments for each implicated competency. In one embodiment, the proficiency ratings are S (strength to build on—performance consistent with an employee at the next higher position level), P (performs well—meeting performance expectation for someone at the employee's level), D (development needed—the employee is falling short of one or more of the expectations identified for a competency area), I (issue—a development need continues to exist), and N (not applicable). In addition to evaluations on an individual competency basis, the Feedback Receiver also selects an overall rating for her performance on the project as a whole. The overall rating consists of one of NME (not meeting expectation), MSE (meeting some expectations), PW (performs well and meets expectations), or EE (exceeds expectations). In alternative embodiments of the present invention the rating consists of a numerical score (1–5, 1–10, 1–100), a traditional letter grade (A–F), or other scoring systems. These alternative rating scales can be entered by a human resources administrator (as described hereinafter the scorecards may be dynamically altered using the Designer Tool).

This self-evaluation step serves several purposes. First, it establishes expectations at the start of each project. Second, it enables the Feedback Receiver to spend some time accounting for and evaluating her performance. This will help the Feedback Receiver to understand where she is succeeding and where she is under-performing and will prepare the Feedback Receiver for a productive counseling session. The self-scoring information is also useful to the Feedback Providers, because it helps them recognize all aspects of performance, including things the Feedback Receiver did which they might have overlooked. The self-scoring information also helps to identify areas where there is divergence between the Feedback Receiver and the Feedback Provider's view. These areas of disagreement can be discussed in detail during the project evaluation meeting. Alternatively, the company may decide to make self-evaluations optional, having Feedback Providers initiate scorecards.

At step 315, the Feedback Receiver submits the scorecard after she is finished filling it out. If the Feedback Receiver elects to complete the scorecard at a later time, she can save the scorecard without submitting it and submit it after completion. Career Counselors, project managers, Feedback Providers, and human resources officers can query the Evaluation System to provide a list of Feedback Receivers who are delinquent in creating project scorecards, and can also use the Evaluation System to automatically send the tardy Feedback Receivers reminder emails. Tracking capability continues through all stages of the evaluation process with real-time reporting.

When the scorecard is submitted, at step 320 an email is automatically sent to the Feedback Provider listed on the scorecard, notifying her that a scorecard is ready for feedback. In an alternative embodiment, the Feedback Receiver can create multiple copies of the populated scorecard for submission to multiple Feedback Providers previously designated by the Feedback Receiver. The scorecard is now at Stage 2—Pending Feedback Provider Review. The scorecard is now available to the Feedback Provider to view and edit. At this point the Feedback Receiver may no longer access the scorecard.

At step 325, the Feedback Provider accesses the scorecard through the Evaluation System's graphical interface. The Feedback Provider can enter free form text feedback in the comment field, and rates the Feedback Receiver in each of the applicable competency areas and for overall performance. The Feedback Provider may also identify competency improvement goals. In one embodiment of the present invention, the Evaluation System may be optionally configured such that the Feedback Provider is not able to view the Feedback Receiver's self-evaluation until after she has already submitted her own evaluation. This has the advantage of forcing the Feedback Provider to independently assess the Feedback Receiver's performance and competency without being influenced by the information in the Feedback Receiver's self-evaluation. Ratings and comments can be subsequently edited once the Feedback Receiver's ratings become viewable.

When finished, at step 330 the Feedback Provider electronically endorses the scorecard and submits the scorecard. Throughout the remainder of the process, when the scorecard is viewed, the ratings of both the Feedback Provider and Feedback Receiver are visible in adjacent columns. A third column can also be provided that denotes with an "x" where the two differ. This can be valuable tool for identifying discussion points between the Feedback Provider and Feedback Receiver. In another version, a link to learning resources is placed in the third column, providing a means to address closing evaluation differences or gaps.

At step 335, an email is automatically sent to the Second Level Reviewer, notifying her that a scorecard is ready for review. The scorecard is now at Stage 3—Pending Second Level Review. At this stage only the Second Level Reviewer may access the scorecard. At step 340, the Second Level Reviewer reviews the scorecard, adds-comments, endorses the scorecard with her approval and submits the scorecard back to the Feedback Provider.

The Second Level Reviewer may be a partner, director, senior manager, or other individual interested in participating in the evaluation process. Alternatively, the Second Level Reviewer may be a quality control reviewer, who will examine the Feedback Provider's comments to ensure that the scorecard includes adequate written comments to support its development ratings assessments, that the competency ratings are appropriate, and that the overall scorecard rating is appropriate.

At step 345, the Second Level Reviewer signs and submits the scorecard. An email is automatically sent to the Feedback Provider, notifying her that the scorecard is ready for review. The scorecard is now at Stage 4—Pending Feedback Provider Final Review, at this point only the Feedback Provider may access the scorecard.

In a preferred embodiment of the present invention, electronic signatures are used to ensure the integrity of the evaluation process. As discussed previously, a user identifies herself to the Evaluation System by entering her unique login name and password. When an evaluation process calls for a user to sign a document, the user selects the Sign Document button. This button is only available if the user has established her identity and the Evaluation System determines that it is proper for the document to be signed by that particular user at that particular time. For example, only the Second Level Reviewer associated with a Stage 3—scorecard may sign the scorecard. When the user selects the Sign Document button, the Evaluation System automatically appends an electronic signature to the document identifying the user signing the document as well as the date and time of the signature. Various known electronic signature techniques may be used to achieve this effect.

At step 350, the Feedback Provider reviews the Second Level Reviewer's remarks and may make rating changes or input additional comments to the scorecard after considering the Second Level Reviewer's comments. The Feedback Provider then schedules a review meeting with the Feedback Receiver. The Feedback Provider may enter final comments and suggestions for future goals onto the scorecard. The Feedback Provider may wish to release a read-only copy of the scorecard to the Feedback Receiver prior to the evaluation meeting, so that the Feedback Receiver may better prepare for the meeting. If the Feedback Provider and the Second Level Reviewer are the same person then the Evaluation System will automatically skip steps 335 through 350.

At step 355, the Feedback Provider and the Feedback Receiver meet to discuss the Feedback Receiver's performance. The scorecard will typically serve as the agenda for the evaluation meeting, particularly in the areas where there was a difference of opinion between the Feedback Provider and the Feedback Receiver.

After the evaluation meeting, at step 360 the Feedback Provider may enter or edit final comments and suggestions for future goals onto the scorecard. The Feedback Provider may wish to record topics discussed on the scorecard. When finished, the Feedback Provider signs and submits the scorecard to the Feedback Receiver.

At step 365, an email is automatically sent to the Feedback Receiver, notifying her that a scorecard is ready for final review. The scorecard is now at Stage 5—Pending Feedback Receiver Final Review. At this stage, only the Feedback Receiver may modify the scorecard, and she is limited to entering her final comments.

At step 370, the Feedback Receiver reviews the finalized scorecard and may record final comments on it. When finished, at step 375 the Feedback Receiver signs and submits the scorecard. At step 380 the scorecard is now at Stage 6—Finalized. At this point no further changes can be made to the scorecard. A copy of the finalized scorecard is automatically emailed to the Feedback Receiver's Career Counselor for review.

The project evaluation process may be modified in many ways to suit a company's particular needs. For example, the Evaluation System may be configured to eliminate the Second Level Reviewer, or alternatively to add additional levels of review. The Evaluation System may also be modified to include feedback from several Feedback Providers on the same scorecard. As discussed previously the Evaluation System can be configured to hide the Feedback Receiver's self-evaluation from the Feedback Provider until the Feedback Provider has evaluated the Feedback Receiver, or this information may be visible to the Feedback Provider from the time she receives the scorecard. Similarly, the Evaluation System may be configured to make the Second Level Reviewer's comments visible or hidden from the Feedback Receiver.

FIG. 4 illustrates schematically a sample scorecard. The scorecard, as indicated by the Scorecard Status field 400, is currently in Stage 3—Pending Second Level Review. The scorecard's header 410 area contains the preliminary project information, such as the Feedback Provider's name, the engagement name, hours billed to the project, etc. In the evaluation area 420, the Feedback Receiver has indicated that her self-evaluation of her performance on the engagement is "PW" or performing well. The Feedback Provider stated that the employee was "EE" or exceeding expectations.

The competency evaluation area for core technical competencies 430 contains a table of competencies implicated during the project. Columns 440 depict the Feedback Receiver's self-evaluation in these areas, the Feedback Provider's evaluation, and a third column "Dif." that indicates when the two scores differ. Note that for purposes of clarity the competency area of the scorecard has been abridged. Each competency is identified by number and accompanied by a brief description of the competency. A comments field 450 is also provided for each competency area. By clicking on each competency number, Feedback Receivers and Feedback Providers are able to view a display of job level specific performance expectations. This guides the users in entering relevant comments for each competency.

The scorecard also contains an overall evaluation comments field 460, where both the Feedback Receiver and the Feedback Provider have already entered comments. The top of the scorecard 470 contains links to other areas within the Evaluation System and function buttons including Create/Edit Comments, Save & Close (save the scorecard but do not advance it to the next stage), Submit to Feedback Provider 480, Assessment Definitions (opens a chart explaining the assessment scale for the scorecard), and Help. The Submit to Feedback Provider button 480 advances the scorecard into Stage 4—Pending Feedback Provider Final Review. The button is context sensitive and is always used to advance the scorecard to the next stage. For example, when the Feedback Provider opens the scorecard, button 480 will now be labeled Release Scorecard to Feedback Receiver.

Figure 5:
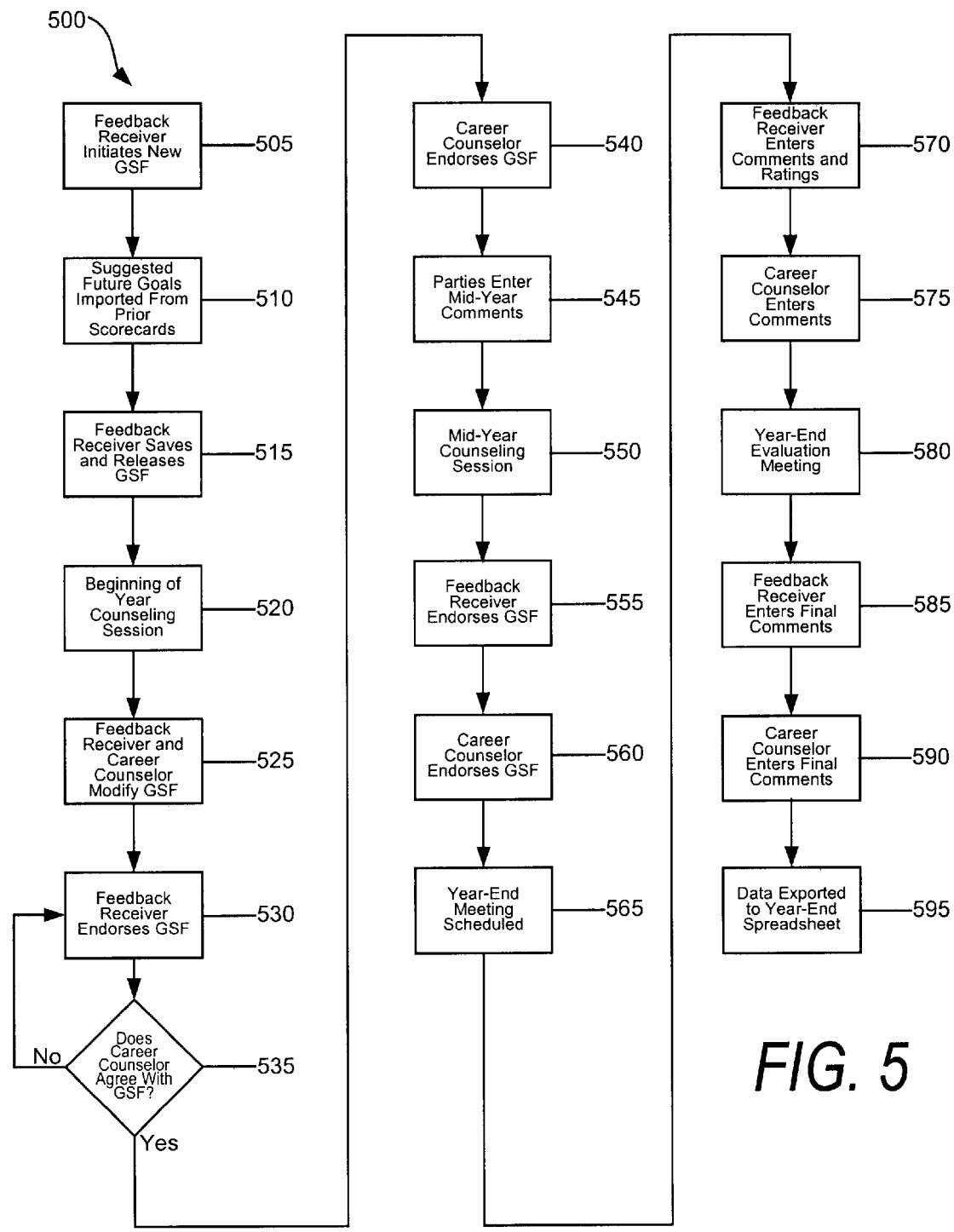
FIG. 5 illustrates, in flow-chart diagram form, the process by which an employee and her counselor complete a goal setting form.

In addition to scorecards, the Evaluation System also receives data on an employee's goals through a separate interface or electronic form, the Goal Setting Form (GSF). Typically the Feedback Receiver will create a goal setting document at the beginning of the year, as preparation for her annual beginning of year counseling session. The Feedback Receiver's Career Counselor may send an email to the Feedback Receiver scheduling the counseling session and requesting that she initiate a GSF. FIG. 5 illustrates in flow-chart diagram form the process by which a Feedback Receiver and her Career Counselor complete a goal setting document. The process, shown generally as 500, begins at step 505 when the Feedback Receiver initiates a new GSF.

The Feedback Receiver populates the GSF with preliminary information, such as the Feedback Provider's name, employee identification number, designated Career Counselor, work group, and other information. As with the scorecards some or all of this information may be automatically entered onto the form. Additionally, the GSF may provide pull down lists or entry validation where appropriate.

At this time, the Feedback Receiver may begin to record goals on the GSF. Goals are selected from a global list of goals. In one embodiment, the goals are divided into five performance areas: market focus, clients, people, innovation, financial, and a miscellaneous category. Each goal area consists of numerous specific goals. For example, the miscellaneous category includes development goals (specific opportunities or training that are needed to assist an employee with skill development, for example mastering the use of a tool), career goals (these are aspirational and more long-term goals than developmental goals, for example developing expertise in a particular area), and personal goals (domestic or international location preferences or professional designations the employee desires to obtain.

Selecting a goal category from the goals list opens a window where the user can input specific goal information. For example, under the non-engagement activity goal category, the user can select a variety of specific non-client based activities including recruiting efforts, attending training programs, counseling others, participating in community service efforts, assisting with firm initiative efforts, and other non-engagement activities. Often the goal activities provide for the input of additional information. For example, under the revenue and profit goal, a user can enter specific revenue and profit targets. The GSF also contains a separate column for inputting actual results at year end. Continuing the previous example, the revenue and profit goal provides a column for entering actual revenue and profit data. The target data can then be easily compared with the actual results.

Certain goals on the GSF are left unstructured. For example, the personal goal does not contain any preset sub-goal options. Instead, the GSF displays an open text field where the user may list personal goals. The user may also create new goals. The GSF provides blank fields for identifying any custom goals, stating how results for that goal will be measured, and listing key actions to achieve the custom goal. For example, a user may create a custom goal to implement an office-wide paper recycling program, state that her success will be measured against the target of recycling at least thirty percent of the paper waste generated by the office, and list key actions to achieve the recycling program such as obtaining the cooperation of the maintenance department and educating co-workers about the new program.

The user may also specify development of any specific competencies as a goal. The Evaluation System can be configured to automatically add all of the competencies to the Feedback Receiver's list of competency development goals. As a resource to identify goal possibilities, the Feedback Receiver and Counselor can click on a button to see a list of all Suggested Future Goals entered on scorecards from the prior year. The scorecards thus inform the GSF. In a preferred embodiment, at step 510 these goals may be automatically entered into the Feedback Receiver's GSF.

Once, a competency development goal is set, a check mark will automatically appear next to that competency when a scorecard is created for that employee. This check mark serves as a reminder that a competency development goal was set using the GSF. The GSF thus informs the scorecards.

At step 515, when the Feedback Receiver is finished initiating the GSF, she saves the GSF and releases it to her Career Counselor. An email is automatically sent to the Career Counselor notifying her that the GSF is available for review. The GSF moves to Stage 1, and the Career Counselor may now access the document. If the Career Counselor has not already done so, she may schedule a beginning of year counseling session with the Feedback Receiver.

At step 520, the Feedback Receiver and the Career Counselor conduct the beginning of year session. The GSF can serve as the agenda for the session. During the session, the Career Counselor may suggest additional goals for the Feedback Receiver. Some of these goals may come from departmental or company wide initiatives. For example, if the company is introducing a new word processing program, the company may make achieving proficiency with the new software a recommended or mandatory goal. The Evaluation System may be configured to automatically add these mandatory goals to all Feedback Receiver GSFs, or to a particular subset of Feedback Receivers (e.g., all employees in the word processing department must learn how to use the new software).

At step 525, the Feedback Receiver and the Career Counselor may modify the GSF. At step 530, when the Feedback Receiver is satisfied with the GSF she signs the document by clicking on the Sign Goals button. At this point, the Career Counselor is automatically notified by email that the GSF has been signed by the Feedback Receiver. The GSF is now at Stage 2. At step 535, if the Career Counselor disagrees with any part of the GSF she may push it back to Stage 1, however, the Career Counselor may not make unilateral changes. At step 540, when the Career Counselor and the Feedback Receiver are both satisfied with the contents of the GSF, the Career Counselor signs the document by clicking on the Sign Goals button. The goals set at the beginning of the year in the GSF are now frozen at Stage 3. An email is automatically sent to the Feedback Receiver notifying her that the Career Counselor has signed off on the GSF and that it is now official. A new line appears on the GSF allowing for entry of new mid-year goals. Throughout the year both parties may enter comments regarding the Feedback Receiver's progress, even when the goals themselves are frozen.

A new line automatically opens up in the GSF, enabling both Feedback Receiver and Counselor to enter new or modified goals, as business and other conditions make appropriate, from this point on through the Mid-Year Touch Point. They may each enter comments pertaining to goals in their individual comments text boxes and may read but not alter each others comments.

A Mid-Year Touch Point button automatically appears for both the Feedback Receiver and the Career Counselor at approximately half-way through the year. The Career Counselor contacts the Feedback Receiver to schedule a mid-year meeting. At step 545 both the Feedback Receiver and the Career Counselor may enter mid-year comments onto the GSF, by selecting the Mid-Year Touch Point button. The Career Counselor and Feedback Receiver may read each other's comments. Both the Career Counselor and the Feedback Receiver may add new goals or refine any goals entered since the initial goals were frozen. Additionally, the Career Counselor and the Feedback Receiver use a yes/no pull down to indicate whether the Feedback Receiver is making appropriate progress within each of the goal categories for the goals pertaining to each of the categories.

At step 550, the Feedback Receiver and the Career Counselor meet to discuss the Feedback Receiver's progress over the first half of the year, indicating whether or not the Feedback Receiver is on track to meet her goals. The GSF may serve as the main agenda for the meeting. Discussion may particularly focus on areas where the Feedback Receiver and the Career Counselor do not concur on the Feedback Receiver's progress. During the meeting both parties may revise their comments and evaluations, and confirm any new goals. The Feedback Receiver and the Career Counselor do not need to agree with each other's evaluations to proceed. However, the Feedback Receiver is asked to indicate actions planned, particularly if there is an indication that she is not on track.

At step 555 the Feedback Receiver signs the document by clicking on the Sign Goals button. The GSF is now at Stage 4. An email is automatically sent to the Career Counselor informing her that the GSF has been signed by the Feedback Receiver. At step 560, the Career Counselor signs the GSF by clicking on the Sign Goals button. An email is automatically generated informing the Feedback Receiver that the Career-Counselor has signed and approved the GSF. The document is now at Stage 5. A mid-year to year-end goal line appears, allowing for the entry of new goals. However, already existing goals (beginning-year or mid-year goals) and comments may not be modified. The Year-End Evaluation Summary and Ratings button is now available.

At step 565, the Career Counselor contacts the Feedback Receiver to schedule a year-end evaluation meeting. At step 570, the Feedback Receiver may enter comments and ratings into the GSF in advance of the meeting. After finishing, the Feedback Receiver submits the GSF. An email is automatically sent informing the Career Counselor that the GSF is available. The document is now at Stage 6. At step 575, the Career Counselor may enter comments. When finished the Career Counselor signs the document, which is now at Stage 7. Both parties may enter comments pertaining to each goal area. Both parties also evaluate the Feedback Receiver's performance at achieving each of the listed goals. The evaluation rating may use a numerical or alphabetical scale. Additionally, both parties enter an overall final appraisal rating, based on their judgment of the Feedback Receiver's success towards achieving her goals.

At step 580, the Career Counselor and Feedback Receiver conduct the year-end evaluation meeting. The GSF, Scorecards, and counseling worksheets (described below) may serve as the agenda for this meeting. After the meeting, at step 585 the Feedback Receiver enters her final comments and clicks on the Save and Finalize button. An email is automatically sent to the Career Counselor. The document is now at Stage 8. At step 590, the Career Counselor enters her final comments and clicks on the Save and Finalize button. The Feedback Receiver is automatically notified by email. The document is now in the Finalized Stage and remains accessible to all parties in the Evaluation System archive. The GSF may no longer be modified. At step 595, the completed GSF may be summarized in a year-end spreadsheet (discussed below).

In alternative embodiments, the counseling sessions may be more or less frequent. For example, for purposes of efficiency the Career Counselor and the Feedback Receiver may decide to combine the year-end evaluation meeting with the beginning of year goal setting session for the next year. The company may also customize the process by adding Second Level Reviewers. The Evaluation System may be configured to send automatic email notification to users when new goals or goal modifications are entered into the database.

FIG. 6 illustrates, in block diagram form, a sample GSF that has been partially completed by a Feedback Receiver. The header area 610 indicates the name of the Feedback Receiver and Career Counselor associated with the GSF. The GSF contains a scroll-down list 620 of goal areas and goals. The Revenue & Profit goal is highlighted on the list, indicating that the user is currently in the process of entering Revenue & Profit goal information. The Revenue & Profit goal information is entered into area 630, where the user has already input a target for total personal service hours and recurring clients revenue. A second column labeled "actual" will be completed at the end of the year to facilitate comparison between the goal target and the actual results.

The GSF also contains a comments area 640, where both the Feedback Receiver and the Career Counselor may input comments relating to the currently selected goal. At the top of the GSF 650, there are links to the other sections of the Evaluation System and to functions such as Save & Close, Preview (view a preview of what the entire GSF looks like), View/Edit Step 1 Information (view or edit the preliminary, non-goal related, information), and Prior Year's Goals (bring up a list of goals identified in scorecards or counseling worksheets from the previous year).

Throughout the year the Career Counselor and the Feedback Receiver may meet for reasons other than a beginning, mid or end-year review. The Career Counselor can use a counseling worksheet to memorialize the meeting. A counseling worksheet may be used to document the substance of the meeting, strength or development needs that were discussed at the meeting, action plans established at the meeting, or next steps agreed upon at the meeting. The counseling worksheet may also be used to serve as a permanent record of the basis for the meeting. For example, if a counseling session is held to reprimand an employee for inappropriate or problematic behavior, the counseling worksheet may be used to document the incident. The counseling worksheets serve as an important record, should it become necessary to terminate or demote an employee. Similarly, a counseling worksheet can be used to record particularly meritorious conduct by an employee.

The employer may choose to use the counseling worksheets to impose formal company guidelines on counseling sessions. One embodiment of the counseling worksheet includes sections for stating the purpose of the session, listing the strengths and developmental needs of the Feedback Receiver, establishing concrete goals and an action plan, and setting up a follow-up plan or meeting. The Evaluation System can be configured to require that each of these sections be completed before a counseling worksheet submission is accepted. Enabling Career Counselors to better comply with the formal requirements of counseling is the purpose of the counseling worksheets. Use of counseling worksheets will emphasize the importance of organization, structure, and documentation of counseling sessions, and will improve the quality of the counseling sessions as well as of the documentary record of these sessions.

After the counseling session, the Career Counselor initiates and completes the counseling worksheet. The Career Counselor then endorses the counseling worksheet. The worksheet is then released to the Feedback Receiver who receives automatic email notification that the document is available. After reviewing the worksheet, the Feedback Receiver may add comments. The Feedback Receiver then endorses the counseling worksheet. The counseling worksheet is then finalized.

The counseling worksheet links to the GSF. Every Counselor has a goal of effectively communicating with her counselees during the year, and the counseling worksheets created are automatically listed below the Counselor's own counseling goals within the GSF, supporting the fact that the Counselor is indeed holding meetings towards meeting her goal as a Counselor. By clicking on a link to each counseling worksheet listed, the Counselor's Counselor can do a quality check of each counseling meeting.

Figure 7:
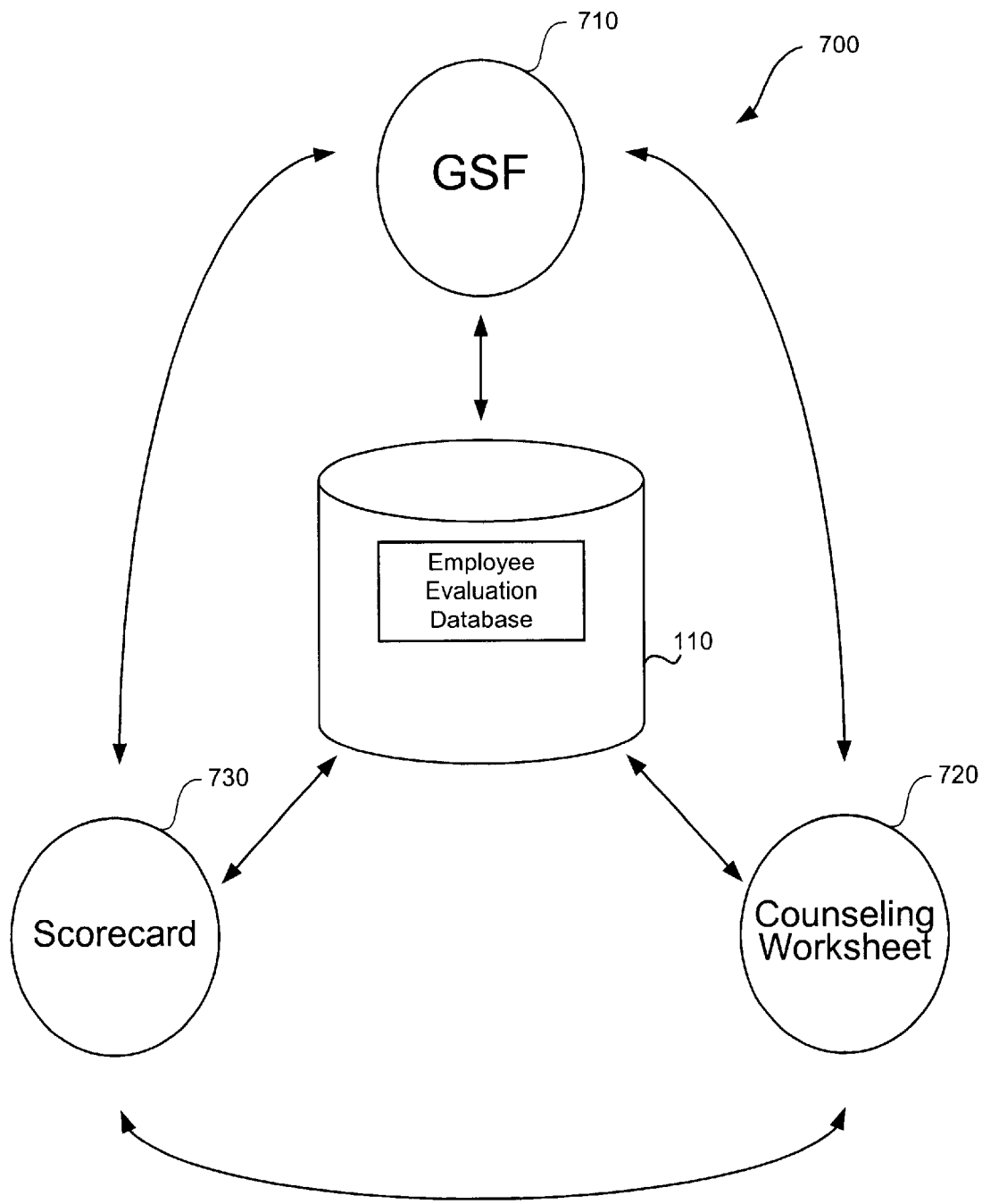
FIG. 7 illustrates, in block diagram form, the flow of information between the various components of the evaluation system.

FIG. 7 illustrates, in block diagram form, the flow of information between the various components and applications of the Evaluation System, shown generally as 700. As discussed previously, there is a communication or interconnectedness between the various evaluation documents.

Data entered through the GSF 710, counseling worksheet 720 and scorecard 730 interfaces or electronic forms are all stored within the Evaluation System database 110. As a result data may be shared or linked between two or more of these interfaces. For example, competencies that an employee has identified as a development goal on a GSF 710 are automatically identified on the employee's scorecards 730. Similarly, when an employee is creating a new GSF 710, competencies that were recommended as developmental goals on the scorecard 730 can be automatically added to the GSF 710 goal list.

Other examples of data linking or sharing between interfaces are present in the Evaluations System. When an employee is designated as a Career Counselor for a Feedback Receiver, a goal to counsel that Feedback Receiver is automatically added to the Career Counselor's GSF 710. When a counseling worksheet 720 is completed for a Feedback Receiver, it is automatically dated and added to a list of counseling meetings, which is viewed below the counseling goal in the Career Counselor's GSF 710. This list includes direct links to each counseling worksheet 720 to facilitate assessment of the quality of each Career Counselor's performance by her supervisor by allowing for a quick review of the Career Counselor's work product.

The counseling worksheet 720 draws on the same set of job competencies used by the scorecard 730. This allows the Feedback Receiver and Career Counselor to focus on the same set of competencies that will be used by Feedback Providers to evaluate the Feedback Receiver throughout the year. Year to year changes in an employee's competencies will thus be reflected in both her scorecards 730 and counseling worksheets 720. The year-end spreadsheet (not shown and discussed below) gathers and summarizes all of the Feedback Receiver's GSFs 710, counseling worksheets 720 and scorecards 730 into a single document, allowing a Career Counselor to compare and track all of the results for each of her counselees, in a single document.

Figure 8:
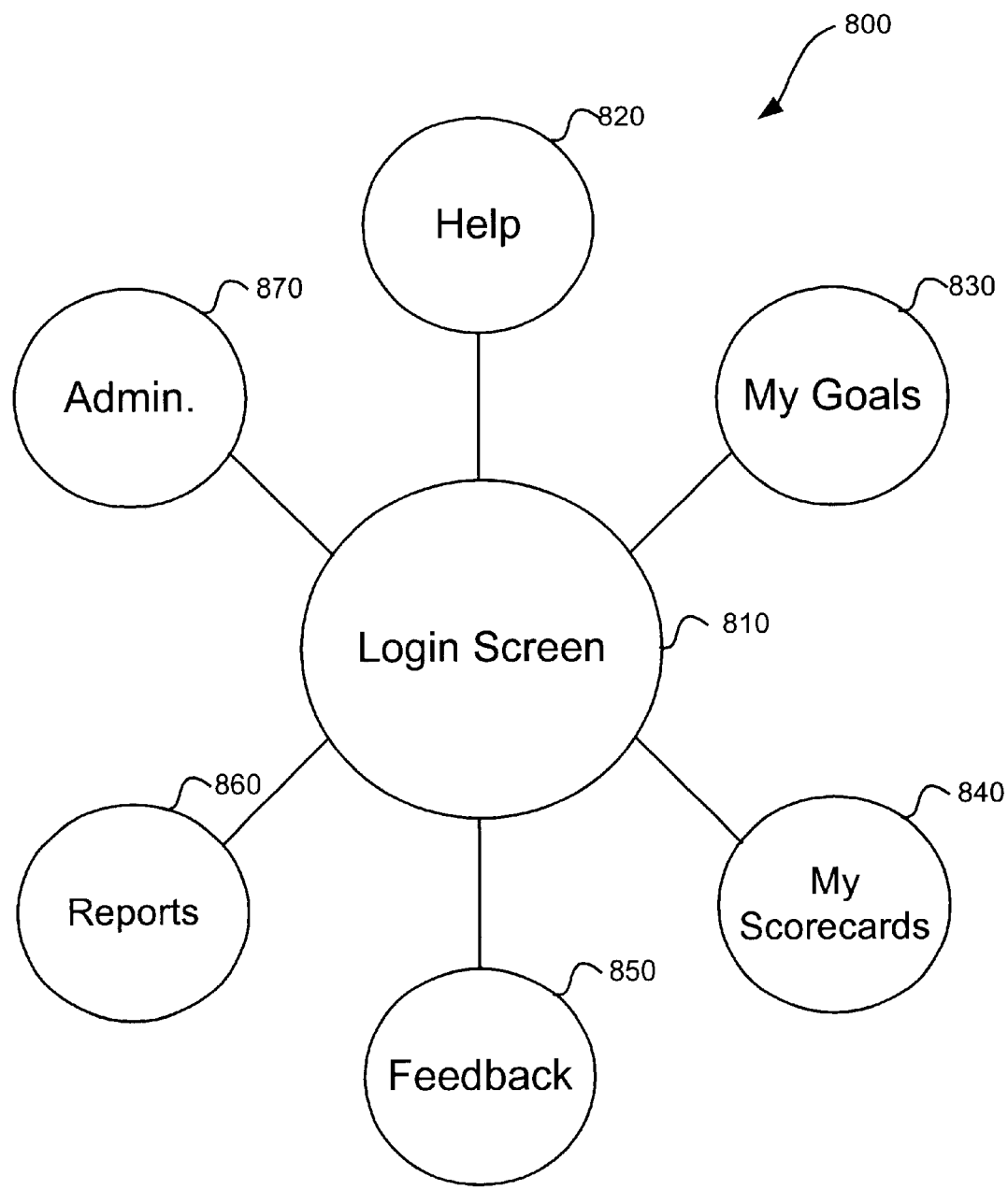
FIG. 8 illustrates, in block diagram form, the layout of the evaluation system.

Referring now to FIG. 8, the layout of the Evaluation System is illustrated in block diagram form, and shown generally as 800. The user accesses the Evaluation System by visiting the login screen 810 via a web browser. At the login screen 810, the user is prompted to enter her usermame and password information, which identifies the user to the Evaluation System. The user may then proceed to various other screens by selecting the appropriate hyperlink. The user may also access a context and role sensitive help section 820 at any time.

At the My Goals screen 830, the user is presented with a table of associated GSFs. By manipulating a pull-down menu the user may request a list of GSFs where the user is designated as the Feedback Receiver, a Career Counselor, or a Second Level Reviewer (in Evaluation Systems that are configured to include a Second Level Reviewer in the GSF process). The table includes the name of the other involved parties (e.g., in a list of GSFs where the user is the Career Counselor, the table will display the Feedback Receivers and the Second Level Reviewers), the date the GSF was created, the date the GSF was last updated, and the individual who performed the last update. The table also displays the current status of the GSF (e.g., Stage 2 or Finalized). Selecting a GSF from the list will allow the user to edit or view the document (this will depend on the current status of the GSF). From the My Goals screen 830, the user may also initiate a new GSF.

The My Scorecards screen 840, in a manner similar to the My Goals screen 830, presents the user with a table of associated scorecards. A pull-down menu may be used to request a list of scorecards where the user is designated as a Feedback Receiver, Career Counselor, or Second Level Reviewer. Selecting a scorecard from the list will allow the user to edit or view the document (this will depend on the current status of the scorecard). From the Create Scorecards screen (not shown) the user may also initiate a new scorecard. In one embodiment of the present invention, the Create Scorecards screen also contains a list of the Feedback Receiver's projects for which a scorecard is due. Selecting a project from the list will initiate a new scorecard, already populated with the project information.

The Feedback screen 850 contains a list of available evaluation forms that may be used to input multi-source feedback. These evaluation forms may be quickly created using the Designer Tool. Multi-source feedback consists of Feedback Receiver evaluation information that comes from individuals outside of the previously described processes. For example, the Evaluation System may be configured to allow employees to commend outstanding performances by co-workers. Clients may also be a source of feedback information. For example, a law firm may routinely contact its clients, provide them with a link to the feedback forms, and request that they evaluate attorneys with whom they have had contact. A company may also use these evaluation forms as a means for employees to provide evaluations of internal services. For example, employees may automatically receive an email requesting that they evaluate the performance of the information technology group each time they use their services. The Feedback screen 850 may also be configured to accept suggestions for improving the current implementation of the Evaluation System.

Alternatively, the evaluations forms may be available in paper format and then inputted, either manually or by scanning, into the Evaluation System database.

FIG. 9 illustrates, in block diagram form, a sample evaluation form for employees to provide feedback to the Information Support Department. The survey header 910 lists preliminary information including the date the survey was completed, the name of the person completing the survey, the person's email address, and the person's employee number. This contact information may be used to contact the evaluator, either for additional information or to remedy problems identified by the survey. In a preferred embodiment this preliminary information is automatically entered onto the survey form. The feedback form may be also configured to receive anonymous feedback. The user completes the survey by filling out the questions 920 and optionally providing additional free-form comments in the comment box 930. When finished, the user selects the Submit button 940 to submit the survey. The survey page also contains links 950 to the other sections of the Evaluation System.

Returning to FIG. 8, the Reports screen 860 is used to create a variety of reports that summarize the information contained within the Evaluation System. The Evaluation System may be used to generate standard reports and custom reports. Standard reports include compliance reports to assist with the administration of the evaluation process (e.g., a list of delinquent scorecards in a certain department or a list of all of the GSFs associated with a particular Career Counselor along with their current status), year-end summary reports (e.g., a summary of all of a Feedback Receiver's scorecards), organizational effectiveness reports (e.g., a summary of the talent available in a particular department or company wide), and other common reports. These reports may be exported into commonly used spreadsheet formats.

The standard reports are listed on the Reports screen 860. After selecting a standard report from the list, the user is prompted to enter in the report criteria (e.g., for a year-end summary, the name of the Feedback Receiver).

The year-end spreadsheet summary report may be configured to include a summary of all of a Feedback Receiver's scorecards, GSFs and counseling worksheets for a particular year. The report will also include a weighted average of the Feedback Receiver's scores in the various competency areas, overall evaluation scores, billing and revenue data, and success at meeting goals, which may serve as the basis for peer comparison. The aggregate annual scores may be used to efficiently make accurate promotion and bonus decisions.

Custom reports can be used to perform a variety of searches on the information contained within the Evaluation System database. The Evaluation System allows for searching by function, service line, geographic area, competency, evaluation score, and all other data items that are stored within the database. For example, a Career Counselor can request a spreadsheet summary of all of the employees within a certain workgroup who have received poor scores in a particular technology competency area. The Career Counselor could then use this information to target employees for special training. Reports can be used to identify problematic or outstanding workgroups, track company or department wide performance trends, or to identify effective managers or Career Counselors (e.g., by using a cascading search to determine which managers are most effective at improving employee performance). Searches can be used to evaluate the effectiveness of training programs and company initiatives (e.g., by comparing before and after performance data). Searches can be used to establish recruiting priorities, by identifying sets of competencies that are lacking within the company or at certain locations. These search and report examples are intended to be illustrative, but not to limit in any way the broad universe of searches and queries that can be performed on the Evaluation System database. In one embodiment of the present invention, custom report searches are conducted using SQL queries.

Figure 10:
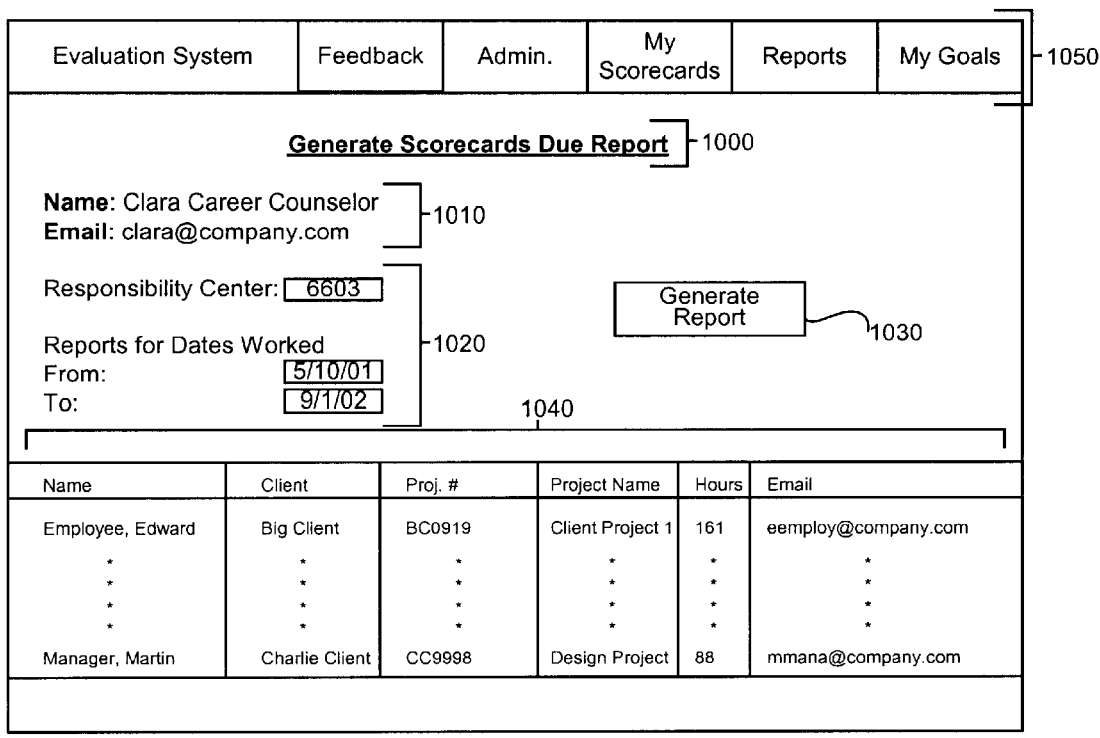
FIG. 10 illustrates, in block diagram form, a sample report screen.

FIG. 10 illustrates, in block diagram form, a sample report screen. The title 1000 indicates that the user has selected a Scorecards Due Report. The header 1010 indicates that the user is Clara Career Counselor and also states her email address. After completing the report criteria fields 1020, the user selects the Generate Report button 1030. A table 1040 is then generated listing all of the Feedback Receivers within the specified work group who have a scorecard due. The table specifies the client, project number, project name, hours billed to the project, and the employee's email address. Selecting an email address from the list will automatically generate an email to the employee stating that a scorecard for the listed project is due. The report screen also includes links 1050 to the other areas of the Evaluation System.

Returning again to FIG. 8, the Administrative Tools page 870 contains a link to the Evaluation System archives, several maintenance tools, and the Designer Tool, a tool for customizing scorecards and other feedback forms. Typically, only the human resources officers or other individuals responsible for administering the Evaluation System are given permission to access the Administrative Tools page 870. Cluster or department managers may also be given permission in order to run their group's evaluation process.

The maintenance tools include tools for changing the stage of a document (e.g., moving a scorecard from Stage 5 back to Stage 4 so that the Feedback Provider may enter additional information), deleting documents, changing name information, assigning or altering a user's role and permissions, quickly approving multiple scorecards (in the place of a Second Level Reviewer), and exporting documents into emails.

The Designer Tool is a suite of functions that can be used to quickly create or modify the templates for scorecards, goal setting forms, counseling worksheets, evaluation forms, and other Evaluation System documents. The Designer Tool may be used to implement global changes in these documents, or to create forms that are for a specific group of Feedback Receivers.

Figure 11:
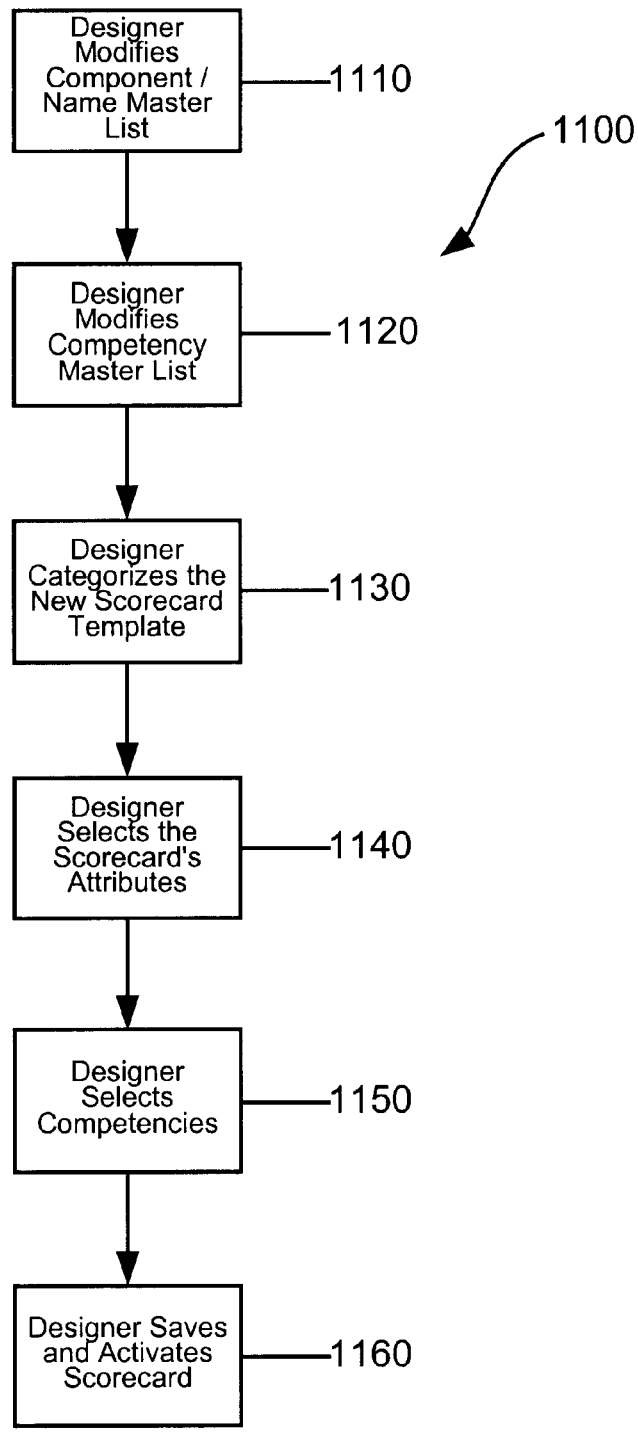
FIG. 11 illustrates, in flow-chart diagram form, the process by which the design tool is used to create a new scorecard template.

FIG. 11 illustrates, in flow-diagram form, the process by which the Design Tool is used to create a new scorecard template. This process, shown generally as 1100, is illustrative of the process that is used to dynamically modify or create the other Evaluation System documents. At Step 1110, the designer accesses the component/name master list. The master list contains a list of all of the recognized component names for a particular field. For example, if scorecards may contain a field for location, the master list would contain a list of all recognized locations within the company. If a component name is not preset, it may be added to the master list. Component names may also be removed from the master list screen.

At step 1120, the designer accesses the competency screen. From this screen the designer can edit the global list of competencies. Competencies are defined by the following fields: short title, description, example, statement of expectations for the competency, comments (optional), link to a training resource web site (optional), function area, practice area, cluster group, and job level. For example, associate level employees in the individual client cluster of the tax practice group will have a set of expectations for the particular competencies that apply to them. The designer may modify the overall rating scale and/or competency assessment scale for the particular scorecard (e.g., the designer may choose to use a scale of 1–10).

At step 1130, the designer accesses the Create a New Template screen and categorizes the new scorecard template. The designer classifies the new scorecard template by selecting various options from pull-down lists such as practice area, job level?, location, and type of scorecard (engagement, non-engagement, administrative). In this manner, for example, the designer can specify that the new scorecard is to be used for mid-level engineers working at a certain fabrication facility. When these engineers initiate a new scorecard and identify their practice area, location, and job level, the scorecard will conform to the newly designed template. As discussed previously, if the desired location, practice area, or other defining characteristic is not presently available in the Evaluation System, the designer may add it at step 1110.

At step 1140, the designer selects the scorecard's attributes. These include the rating scale that will be used on the scorecard (the competency ratings and overall performance rating may use difference scales), if the Second Level Reviewer comments will be visible to the Feedback Receiver, and other options.

At step 1150, the designer selects the competencies that will be included on the scorecard, groups the competencies into clusters, and provides names for the clusters. The designer may choose to accept the default competency settings or to customize them.

At step 1160, the designer saves the scorecard and selects the Make Active option. The new scorecard is now available.

Accordingly, the invention includes a method and system for evaluating employees, and a tool for quickly modifying or creating evaluation documents. The preferred embodiment of the present invention is a network accessible Employee Evaluation system, where multiple entities within a company can access a database to input or retrieve employee evaluation information.

The overarching philosophy of the Evaluation System is WYN/WYN—what you need when you need. The evaluation process of the present invention is one that is transparent, formal and consistent. Using the Evaluation System will ensure that employees regularly receive meaningful and responsive feedback, which will boost morale, job satisfaction and motivation. The improved feedback that employees receive will accelerate their development, yielding dividends to both employee and employer alike. The Evaluation System allows the company to effectively communicate goals and performance expectations to its employees.

The Evaluation System incorporates sources of feedback that are overlooked by prior art evaluation procedures, and provides a permanent in-depth evaluation record, that will allow for more informed development, just-in-time training, promotion and incentive decision making. Compliance is trackable and Feedback Providers and Counselors are accountable. Additionally, the detailed record will be important if it becomes necessary to discipline or terminate an employee.

The present invention provides for the ability to perform high-level searches on evaluation information allowing a company to easily obtain information that was not readily available with prior art evaluation systems. A company can use the Evaluation System to assess its bench strength in various competency areas, determining where its employees are strong and where improvement is needed. The Evaluation System can be used to uncover correlations between client satisfaction and employee competency ratings, identifying key skills to emphasize in future training. Effective managers and leaders can be identified by tracking the progress and performance of their employees. Custom searches can be used to quickly identify appropriate employees to staff on a particular project. For example, a manager could, in a matter of minutes, conduct a company wide search for employees possessing a particular combination of skills, or who have requested to be transferred to a new location.

In addition to providing improved functionality over prior art evaluation processes, the Evaluation System is efficient, reducing the burden of administering the evaluation process. Human resources officers can use reports to monitor the evaluation process, quickly identify individuals who are behind schedule, and automatically generate reminder emails. This makes it easier for a company to ensure that its managers provide timely and accurate performance and development feedback, and to recognize their effective performance. The Designer Tool allows administrators to quickly create or modify forms, without the need for technical training.

In so far as embodiments of the invention described herein may be implemented, at least in part, using software controlled programmable processing devices, such as a computer system, it will be appreciated that one or more computer programs for configuring such programmable devices or system of devices to implement the foregoing described methods are to be considered an aspect of the present invention. The computer programs may be embodied as source code and undergo compilation for implementation on processing devices or a system of devices, or may be embodied as object code, for example. Those of ordinary skill will readily understand that the term computer in its most general sense encompasses programmable devices such as those referred to above, and data processing apparatus, computer systems and the like.

Preferably, the computer programs are stored on carrier media in machine or device readable form, for example in solid-state memory or magnetic memory such as disk or tape, and processing devices utilize the programs or parts thereof to configure themselves for operation. The computer programs may be supplied from remote sources embodied in communications media, such as electronic signals, radio frequency carrier waves, optical carrier waves, and the like. Such carrier media are also contemplated as aspects of the present invention.

Having described exemplary embodiments of the present invention with reference to the accompanying drawings, if will be appreciated that the present invention is not limited to those precise embodiments, and that various changes and modifications can be effected therein by one of ordinary skill in the are without departing from the scope or spirit of the invention as defined herein.

It is also to be understood that the following claims are intended to cover all of the generic and specific features of the invention herein described and all statements of the scope of the invention which, as a matter of language, might be said to fall therebetween.

What is claimed is:

1. A computer-aided method of evaluating personnel performance comprising the steps of making available to a first user a first electronic form, inputting a first set of data into the electronic form corresponding to the evaluation of an employee, submitting the form including the first set of data for review to a second user, and inputting a second set of data into the electronic form corresponding to the second user's review of the employee.

2. The method of claim 1 further comprising the steps of making available to the first user a second electronic form and inputting a third set of data into the second electronic form corresponding to the employee's performance goals.

3. The method of claim 2 further comprising the step of making the second electronic form and third set of data available to at least one of the second user and a third user.

4. The method of claim 2 further comprising the steps of making the second electronic form and third set of data available to a third user for follow up between the first user and the third user.

5. The method of claim 1 further comprising the step of electronically notifying the first user that the first electronic form must be completed.

6. The method of claim 5 wherein the first user is notified based on one of a prescribed number of hours billed on a task, a prescribed time period and completion of a project.

7. The method of claim 1 wherein the first electronic form is initiated upon completion of project.

8. The method of claim 1 further comprising the step of electronically notifying the second user that the first electronic form is available for review.

9. The method of claim 1 wherein after the first user submits the first electronic form for review the first user is prevented from at least one of accessing the electronic form and editing the electronic form.

10. The method of claim 1 wherein the first electronic form includes at least one of a pull-down menu and a text box for inputting data.

11. The method of claim 1 wherein the first set of data and the second set of data are displayed on the first electronic form for comparison.

12. The method of claim 1 further comprising the step of making the first electronic form and the first set of data and the second set of data available to a third user for additional review.

13. The method of claim 1 further comprising the step of linking data between the first electronic form and the second electronic form.

14. A computer-aided method of evaluating personnel performance comprising the steps of making available to a first user a first electronic form, inputting a first set of data into the first electronic form corresponding to the an employee's self evaluation, submitting the form including the first set of data for review to a first reviewer, inputting a second set of data into the first electronic form corresponding to the first reviewer's review of the employee, making available to a second reviewer the first electronic form including the first set of data and second set of data, and making available to the first user a second electronic form for inputting a third set of data.

15. The method of claim 14 further comprising the steps of electronically notifying the first reviewer when the first electronic form is available for review and notifying the second reviewer when the first electronic form is available for review.

16. The method of claim 14 further comprising the steps of endorsing the first electronic form with an electronic signature associated with the second reviewer.

17. The method of claim 14 wherein the third set of data corresponds to the employee's performance goals.

18. The method of claim 17 further comprising the step of making the second electronic form and the third set of data available to a counselor for follow up between the employee and the counselor.

19. The method of claim 14 comprising the step of populating at least one of the first electronic form and the second electronic form with data retrieved from a database.

20. The method of claim 14 wherein the first set of data is not displayed to the first reviewer until the first reviewer has entered the second set of data.

21. In a computer system having access to a database of employee-related information, a method of evaluating an employee comprising the steps of accessing the system to display an electronic evaluation form, inputting a first set of data corresponding to an employee's self evaluation, storing the first set of data, making the electronic evaluation form available to a first reviewer including the first set of data, inputting a second set of data corresponding to the first reviewer's review of the employee, and making the electronic evaluation form and first set of data and second set of data available to a second reviewer.

22. The method of claim 21 further comprising the step of accessing the system to display the electronic evaluation form including the stored first set of data.

23. The method of claim 21 wherein the electronic evaluation form including the first set of data is made available to a user based on the user's preassigned role.

24. The method of claim 21 wherein an identification code associated with the user controls access to the system.

25. The method of claim 21 further comprising the step of electronically endorsing the electronic evaluation form.

26. The method of claim 21 wherein the electronic evaluation form includes at least one of fill-in boxes and pull down menus to input data.

27. The method of claim 21 further comprising the step of retrieving from the database data on at least one of the employee and the first reviewer to populate the electronic evaluation form.

28. The method of claim 21 further comprising the step of sending the employee an email requesting that the employee initiate an electronic evaluation form.

29. The method of claim 21 further comprising the step of having the employee initiate an electronic evaluation form based upon at least one of completion of a task, after a specified period of time and after a specified number of hours billed to a task.

30. The method of claim 21 wherein the electronic evaluation form is initiated by one of a career counselor and a human resources employee.

31. The method of claim 21 wherein after the electronic evaluation form is made available to the first reviewer the employee can not access the form until after the reviewer has submitted the electronic evaluation form.

32. The method of claim 21 wherein data stored on the database is accessible for generating reports including at least one of a summary of an employee's evaluation data, a summary of the evaluation data for a group of employees associated with a reviewer and the status of the reviewer's review.

33. The method of claim 21 further comprising the step of making the electronic evaluation form and the first and second set of data accessible to a second reviewer.

34. The method of claim 21 further comprising the steps of accessing the system to display a second electronic form and inputting a third set of data corresponding to the employee's performance goals.

35. In a computer system in communication with at least one database and including display means for displaying a plurality of interfaces for inputting data and means for controlling access to the system based on a user's role, a method of evaluating work-related performance of an individual comprising the steps of presenting to a first user a first interface for inputting a first set of performance evaluation data, presenting the first interface and first set of data to a second user for inputting a second set of performance evaluation data, presenting to the first user a second interface for inputting a third set of performance data, and presenting to one of the second user and a third user the second interface and third set of performance data.

36. The method of claim 35 wherein the first user is an employee to be evaluated, the first interface is an electronic evaluation form and the first set of data is self evaluation data input by the employee.

37. The method of claim 36 wherein the second user is reviewing the work related performance of the employee and the second set of data is input by the second user.

38. The method of claim 35 wherein the first user inputs the first set of data and in further step submits the first set of data for presentation to the second user.

39. The method of claim 38 further comprising the step of notifying the second user that the first interface and the first set of data are available for review.

40. The method of claim 35 wherein the second interface is an electronic form for receiving inputs on employment goals of the first user.

41. The method of claim 40 wherein the third user is a career counselor.

42. The method of claim 35 further comprising the step of presenting the one of the second user and the third user with a third interface for inputting a fourth set of data.

43. An employee evaluation system comprising at least one database, display means for displaying a plurality of interfaces for inputting data, means for inputting data, means for accessing and presenting to a first user a first interface for inputting a first set of performance evaluation data, means for presenting the first interface and first set of data to a second user for inputting a second set of performance evaluation data, means for presenting to the first user a second interface for inputting a third set of performance data, and means for presenting to one of the second user and a third user the second interface and third set of performance data.

44. The system of claim 43 further comprising computer readable program code embodied on a program storage device for customizing at least one of the first interface and the second interface.

45. The system of claim 43 further comprising means for controlling access to the system based on a user's role and login information.

46. The system of claim 43 further comprising means for electronically signing at least one of the first interface and the second interface.

47. The system of claim 43 further comprising means for generating reports based on searches of the at least one database.

48. The system of claim 43 further comprising means for generating a list of overdue performance evaluation data by one of the first user and the second user.

49. The system of claim 48 further comprising means for electronically notifying users who are delinquent in inputting evaluation information.

* * * * *